United States Patent
Dutta et al.

(10) Patent No.: US 9,094,412 B2
(45) Date of Patent: Jul. 28, 2015

(54) SELF ORGANIZING IP MULTIMEDIA SUBSYSTEM

(75) Inventors: Ashutosh Dutta, Bridgewater, NJ (US); Dana Chee, Maplewood, NJ (US); Christian Makaya, New Brunswick, NJ (US); Subir Das, Belle Mead, NJ (US); Fuchun Joseph Lin, Morris Plains, NJ (US); Ming Lai, Short Hills, NJ (US); Tsunehiko Chiba, Saitama (JP); Satoshi Komorita, Saitama (JP); Hidetoshi Yokota, Saitama (JP)

(73) Assignee: Telecordia Technologies, Inc., Piscataway, NJ (US)

(*) Notice: Subject to any disclaimer, the term of this patent is extended or adjusted under 35 U.S.C. 154(b) by 821 days.

(21) Appl. No.: 12/771,207

(22) Filed: Apr. 30, 2010

(65) Prior Publication Data

US 2011/0110223 A1    May 12, 2011

Related U.S. Application Data

(60) Provisional application No. 61/174,683, filed on May 1, 2009.

(51) Int. Cl.
| | | |
|---|---|---|
| *G01R 31/08* | (2006.01) | |
| *H04L 12/28* | (2006.01) | |
| *H04B 7/00* | (2006.01) | |
| *H04L 29/06* | (2006.01) | |
| *H04L 12/24* | (2006.01) | |
| *H04L 25/03* | (2006.01) | |
| *H04L 5/14* | (2006.01) | |

(52) U.S. Cl.
CPC ........ *H04L 65/1016* (2013.01); *H04L 41/0677* (2013.01); *H04L 41/5019* (2013.01); *H04L 65/80* (2013.01); *H04L 5/1438* (2013.01); *H04L 25/03273* (2013.01)

(58) Field of Classification Search
CPC ............... H04L 45/28; H04L 41/0654; H04L 2012/5627
USPC .......................................................... 370/221
See application file for complete search history.

(56) References Cited

U.S. PATENT DOCUMENTS

| | | | |
|---|---|---|---|
| 6,426,947 B1 | 7/2002 | Banker et al. | |
| 6,973,023 B1 | 12/2005 | Saleh et al. | |
| 7,260,716 B1 | 8/2007 | Srivastava et al. | |
| 7,302,609 B2 | 11/2007 | Matena et al. | |
| 2005/0065801 A1* | 3/2005 | Poikselka et al. | 705/1 |
| 2005/0078660 A1 | 4/2005 | Wood | |
| 2008/0317000 A1* | 12/2008 | Jackson | 370/352 |
| 2009/0046655 A1* | 2/2009 | Zhao et al. | 370/331 |
| 2009/0097398 A1 | 4/2009 | Belinchon Vergara | |
| 2009/0210743 A1* | 8/2009 | Gu et al. | 714/15 |
| 2010/0293261 A1* | 11/2010 | Belinchon Vergara et al. | 709/223 |
| 2011/0128843 A1 | 6/2011 | Przybysz et al. | |

FOREIGN PATENT DOCUMENTS

| | | |
|---|---|---|
| WO | 2009/039890 A1 | 4/2009 |
| WO | 2009/039894 A1 | 4/2009 |

OTHER PUBLICATIONS

The international search report dated Jul. 13, 2010, 2 pages.

* cited by examiner

*Primary Examiner* — Faruk Hamza
*Assistant Examiner* — Abu-Sayeed Haque

(57) ABSTRACT

A self-organizing IP multimedia subsystem exhibiting node splitting and node merging functions wherein any node within the self organizing IP multimedia subsystem may assume any role thereby providing node balancing and fault tolerance to an overall network.

9 Claims, 24 Drawing Sheets

FIG. 2
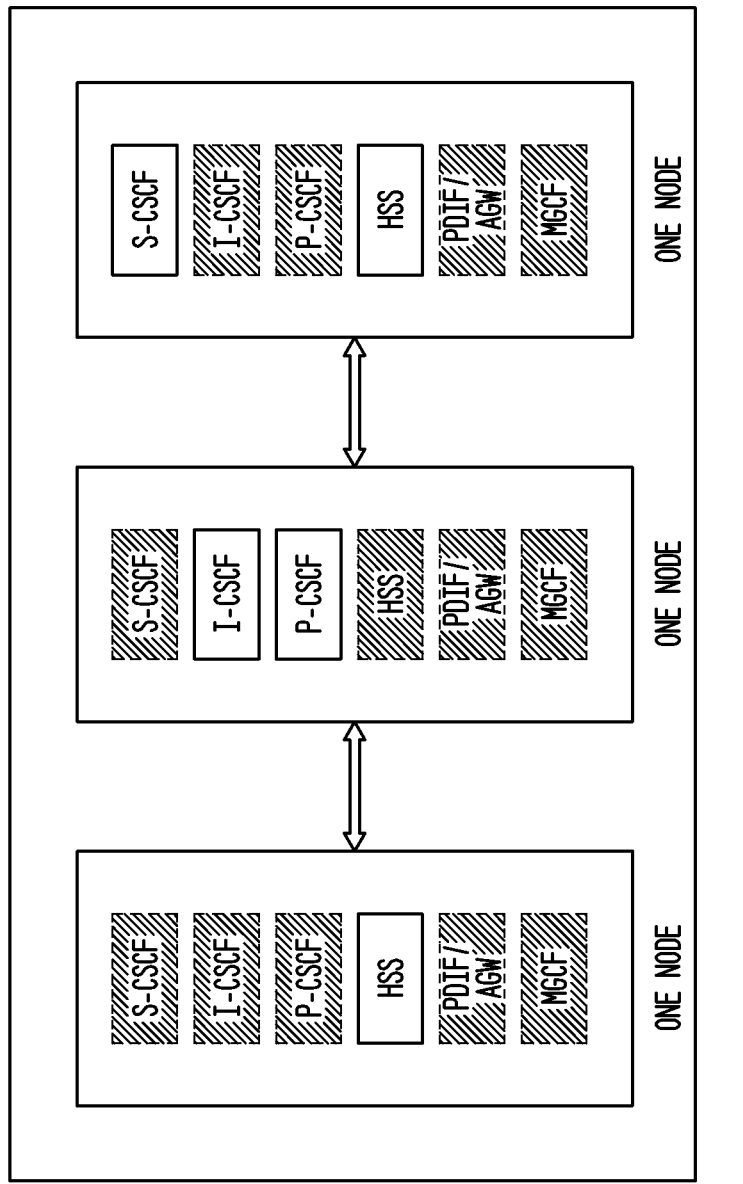
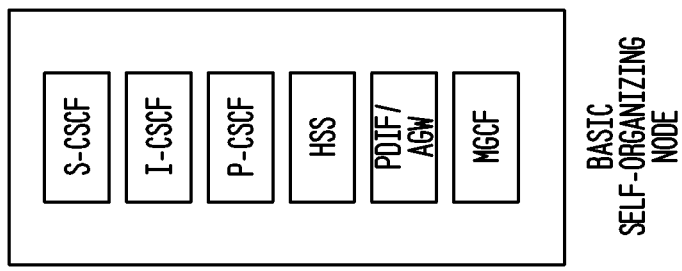

FIG. 3E

```
* for (ever)
   * receive message (NodeX)
      * RoleRequest
         * Check current assignments
         * determine what changes are needed
         * run reassignment (NodeX,new)
      * RoleQueryResponse
         * mark NodeX as having responded
         * check that roles listed match current database
         * if current load is too high
            * run reassignment (NodeX,loaded)

* for(ever)
   * send <RoleQuery> to each node [3]
   * for each node
      * check last responded time
      * if too long ago
         * mark node as out of service
         * if role was P
            * update DHCP to have different P for any ESSIDs using dead node
         * run reassignment (NodeX,dead)
   * sleep
```

FIG. 3G

```
--- reassignment (Node,why)
   why == new, Node is a new one, and will be the only one receiving roles
      why == loaded, Node is overloaded, others will take some if its services
                    and it will lose services
      why == dead, Node is dead, others will take all of its services reassignment (Node,why)
   * determine what changes are needed
   * if why = new
      * send <RoleAssignment> to Node
      * add to wait list
   * else
      * select nodes to add roles
      * for each node gaining
         * send <RoleAssignment> with addition
         * add to wait list
   * collect all RoleQueryResponses
   * for each node gaining
      * if assignment contains S
         * for each node running P
            * send <RoleChange> containing OldS, NewS, and percentage [2]
      * if assignment contains I
         * for every node running P
            * send <RoleChange> containing OldI, NewI
      * if assignment contains P
         * for every node running S
            * send <RoleChange> containing OldP, NewP, and percentage [2]
      * collect RouteQueryResponse
   * if why == loaded
      * send RoleAssignment with deletion to Node
      * collect RouteQueryResponse
```

FIG. 3I

```
* at start
    * send <RoleRequest>
* for(ever)
    * receive message
        * RoleAssignment [1]
        * for each role listed
            * if not currently running, start
        * for each role not listed
            * stop that component
        * send <RoleQueryResponse> to ACK role changes
        * RoleChange [2]
            * for each role listed
                * send oldAddr, newAddr, percentage to the component
            * send <RoleQueryResponse> to ACK role changes
        * RoleQuery [3]
            * check current load average
            * send RoleQueryResponse with current load and current apps
```

* receive NOTIFY
  * register with address inside NOTIFY
  * SUBSCRIBE to address inside NOTIFY

FIG. 3M

```
* for (ever)
  * receive RoleChange
    * If change is for I
      * update I
    * If change is for S
      * for each oldAddr
        * find all MH registrations using that addr
        * total number, then multiply by percentage
        * select that number of MHs (first N, last N, or
whatever)
        * for each MH selected
          * send NOTIFY with NewAddr
          * update internal structures with new information

* receive SUBSCRIBE
  * store info from SUBSCRIBE
  * forward on to S
```

FIG. 6

```
Request-Line: MESSAGE sip:node01@[3ffe:5::201]:5066 SIP/2.0 <RoleRequest>
<Id
    address="3ffe:5::201"
    name="node01"/>
<Ability
        cpus="1"
        load="0.00"
        memory="65.43"
        rate="2800.000"
        totalMemory="1000"/>
        <CurrentRoles/>
</RoleRequest>

Request-Line: MESSAGE sip:domain1-ims
rtr@[3ffe:5::100]:5066 SIP/2.0
extensible Markup Language
    <RoleAssignment>
        <Id
          name="node01"/>
        <database
            name="none"/>
        <CurrentRoles>
            <Role
              name="hss"/>
            </CurrentRoles>
    </RoleAssignment>
```

CONTROLLER

FUNCTIONS ASSIGNED TO NODE 1

IMS NODES ARE ONLINE

P AND S ROLES ARE ASSIGNED TO NODE 2 AND NODE 3

SELF ORGANIZING IP MULTIMEDIA SUBSYSTEM

CROSS REFERENCE TO RELATED APPLICATIONS

This application claims the benefit of U.S. Provisional Patent Application No. 61/174,683 filed 1 May 2009 which is incorporated by reference as if set forth at length herein.

FIELD OF THE INVENTION

This invention relates generally to the field of internetworking and in particular to a self organizing Internet Protocol (IP) multimedia subsystem.

BACKGROUND OF THE INVENTION

IP Multimedia Subsystem (IMS) is a generic architecture for offering multimedia and voice over IP services. Advantageously, IMS is access independent as it supports multiple access types including Global System for Mobile (GSM), Wideband Code Division Multiple Access (W-CDMA), Code Division Multiple Access (CDMA), Wireless Local Area Network (WLAN), Wireline and other packet data applications. Consequently IMS may facilitate the ubiquitous availability of interne technologies such as web browsing, e-mail, messaging and video conferencing while enabling service providers to introduce new services.

BRIEF SUMMARY OF THE DISCLOSURE

An advance is made in the art according to an aspect of the present invention directed to a self-organizing IP multimedia subsystem exhibiting node splitting and node merging functions. In sharp contrast to the prior art, any node within the self organizing IP multimedia subsystem may assume any role and therefore exhibit a node balancing and fault tolerance heretofore unknown with present systems.

BRIEF DESCRIPTION OF THE DRAWINGS

A more complete understanding of the present disclosure may be realized by reference to the accompanying drawings in which:

FIG. 2 is a schematic diagram showing high level concepts of a self-organizing IMS nodes according to an aspect of the present disclosure;

FIG. 3($b$) is a schematic diagram showing the notification of P-CSCF role change by master node according to an aspect of the present disclosure;

FIG. 3($c$) is a schematic diagram showing the notification of S-CSCF role change by master node according to an aspect of the present disclosure;

FIG. 3($d$) is a flow chart showing overall master node operation according to an aspect of the present disclosure;

FIG. 3($e$) is a pseudocode listing showing overall master node operation according to an aspect of the present disclosure;

FIG. 3($f$) is a flow chart showing overall role assignment according to an aspect of the present disclosure;

FIG. 3($g$) is a pseudocode listing showing overall role assignment according to an aspect of the present disclosure;

FIG. 3($h$) is a flow chart showing IMS node operations mode according to an aspect of the present disclosure;

FIG. 3($i$) is a pseudocode listing showing IMS node operations according to an aspect of the present disclosure;

FIG. 3($j$) is a flow chart showing mobile node operation according to an aspect of the present disclosure;

FIG. 3($k$) is a pseudocode listing showing mobile node operation according to an aspect of the present disclosure;

FIG. 3($l$) is a flow chart showing P-CSCF operations according to an aspect of the present disclosure;

FIG. 3($m$) is a pseudocode listing showing P-CSCF operations according to an aspect of the present disclosure;

FIG. 3($n$) is a flow chart showing S-CSCF operations according to an aspect of the present disclosure;

FIG. 6 is a pseudocode listing of an exemplary role request and assignment using MESSAGE according to an aspect of the present disclosure;

DETAILED DESCRIPTION

Figure 1:
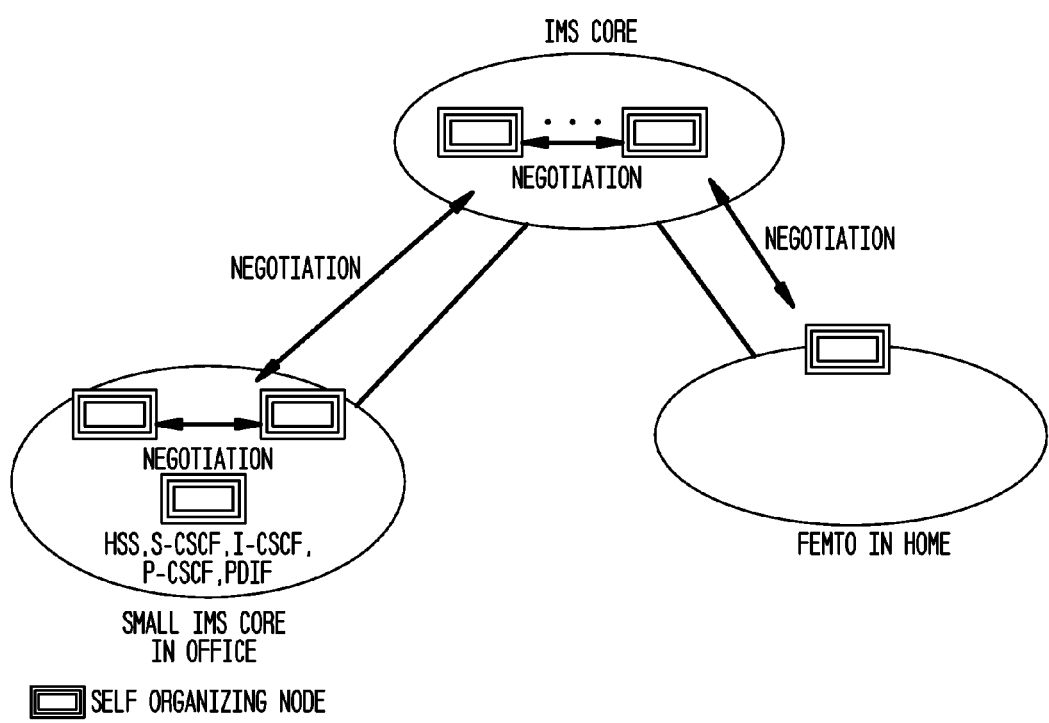
FIG. 1 is a schematic diagram showing an application of self-organizing IMS according to an aspect of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

Thus, for example, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function.

The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

By way of some additional background it is noted that current implementations of IMS have a number of shortcomings that deter its widespread deployment. In particular—and depending upon the specific architecture—there exists a one-to-one mapping between a functional component and a physical node in those circumstances where a node is equipped to perform only a certain function. As a result, a large number of network nodes must be deployed which in turn make network management and operation difficult. This is particularly true in environments where dynamic adaptation is required as a result of functionality, processing, network load(s) and network node failures.

One way to mitigate these shortcomings is to allocate redundant network resources. Unfortunately, such redundancy comes at a cost and it will not allow service providers to offer services at lower cost. Alternatively, one could define new techniques that support dynamic adaptation with the nodes merging and splitting the IMS functional components. By node merging, we mean all the IMS functional components merge and operate on a single physical node; whereas, by node splitting we mean the functional components get distributed across different physical nodes.

In its current form however, IMS architecture and protocols do not have the mechanisms that permit IMS functionalities (e.g., A Proxy-Call Session Control Function (P-CSCF), An Interrogating-Call Session Control Function (I-CSCF), and A Serving-Call Session Control Function (S-CSCF)) to migrate from one node to another. Accordingly, one aspect of the present disclosure is a set of methodologies that provide several self-organizing features of IMS. These methodologies may advantageously provide additional flexibilities to the current IMS architecture and help service providers to better manage the IMS components in a dynamic environment where nodes or links are prone to failure and the system grows or shrinks with demand.

Self Organizing Architecture

FIG. 1 shows an exemplary deployment scenario for a self organizing IMS in which nodes and links may fail. More specifically, a number of locations including nodes are shown namely: an IMS Core network location; an IMS office network location; and an IMS Home network location. For the purposes of our discussion, the nodes shown are depicted as being self-organizing node(s) according to an aspect of the present disclosure.

As may be understood and appreciated and according to an aspect of the present disclosure, all of the nodes shown—regardless of location—may advantageously take over function(s) of other nodes depending upon the particular network configuration, failure and load(s). As a result, the core network exhibits an efficient redundancy with a particular utility for small configurations, i.e., Office, Home. In particular, the nodes shown in the FIG. 1 small IMS core Office are shown as recognizing their role(s) as a small core in that office which includes such functions as Home Subscriber Server (HSS), S-CSCF, I-CSCF; P-CSCF; and Packet Data Interworking Function (PDIF). According to an aspect of the present disclosure, if any of the three nodes shown in the small IMS core office were to fail, other(s) may advantageously take over those failed functions.

Similarly, the nodes shown in the IMS Core recognize their function(s) and negotiate with other nodes and advantageously take over any missing/failed/failing functions thereby avoiding overall IMS system trouble(s). Likewise, the node shown in the home has recognized its role as a femto and home gateway. As may be appreciated, the femto is a small base station entity—arguably the smallest—that a user can install in a home or office. As is shown, the various nodes in the various locations negotiate with one another regarding any capabilities/roles that they will individually provide to the overall network.

FIG. 2 shows how a basic IMS node such as those shown previously in FIG. 1—each capable of running several IMS functions—can adapt itself according to server load and network conditions. More particularly, the FIG. 2 shows generally how a single, basic self-organizing node may organize into several node(s) exhibiting different functions. That is to say, role(s) which may reside in a single node are capable of being spread across a number of distinct, individual nodes.

It is assumed that the basic self-organizing node and all the nodes are capable of taking on the roles of the IMS components, such as S-CSCF (Serving-Call Session Control Function), I-CSCF (Interrogating-Call Session Control Function), P-CSCF (Proxy-Call Session Control Function), Home Subscriber Server (HSS), and Packet Data Interworking Function/Access Gateway (PDIF/AGW), and Media Gateway Control Functions (MGCF). These nodes can run one or multiple instances of different IMS functions.

As shown schematically in FIG. 2, the functions shown in a basic self organizing node are shown being spread across three individual nodes. Note that while the functions are shown as being spread across the three individual nodes, the particular number of nodes over which the functions may be spread may be less or greater depending upon the particular network environment and circumstances. With this concept in place, we now introduce the functional behavior and interactions of different logical entities that constitute the self organizing IMS architecture that is the subject of the present disclosure.

Self-Organizing Approach

As will become appreciated by those skilled in the art, a self-organizing IMS may be based on one of two modes namely: centralized or distributed. In the centralized mode, there is a master node that maintains a database containing operator policy and state information for all nodes under its control. For example, this master node can be a Home Subscriber Server (HSS). The reason for this choice may be—for example—that the HSS is the master database of a cellular network and the availability and reliability of such database is necessarily much greater than ordinary nodes.

The Master Node database is updated when i) a new node notifies the Master Node about its capabilities; ii) a specific IMS role has been assigned to the node, and, iii) a node changes roles due to overloading or failure. Preferably, an efficient policy-based mechanism should be defined in the master node to assign the functionalities or roles.

In the distributed mode of operation a new IMS node advantageously announces its presence through—for example—a multicast message. Existing IMS nodes reply to this message if they need to transfer some of their current functionalities. As may be appreciated, this transfer may result in conflicts but fortunately may be resolved by a simple rule such as, first in first out (FIFO) based on response message. If a node receives no responses, it should assume that there exists no other node and it takes over all roles.

In either the centralized or distributed mode, negotiation or capabilities exchange and event notification protocols should be defined. In fact, the decision to assign a role to a new node will be based on its capabilities (e.g., CPU, load, processing power, memory). We focus on the centralized mode. Some of these functionalities can be easily applied to a distributed mode as well. We next describe the important functions of self-organizing IMS that are needed in addition to the standard IMS functions Node Discovery Function In a preferred embodiment and according to an aspect of the present disclosure, there are at least two kinds of node discovery functions in a Self Organizing IMS, namely: 1) a master node discovers IMS nodes and their capability(ies); and 2) a mobile node discovers an IMS node for registration. In a particular embodiment, the master node may discover other IMS nodes and their capability(ies) via a negotiation protocol. Mobile node(s)—on the other hand—may advantageously employ standardized mechanisms such as DHCP options or a DNS query for IMS node discovery.

Role Request and Assignment

According to an aspect of the present disclosure, when an IMS node becomes active or "comes online", it requests a role or function from a master node by sending its capability(ies) to that master. The capability(ies) may include—for example—IMS functionality such as P-CSCF, S-CSCF, or I-CSCF, and/or other server specific capability such as processing power, memory, etc. Based on these capability(ies), the master node assigns a given role to the new node.

Accordingly, this role assignment can happen due to load balancing, node failure and other node management purposes that can be governed by high level policies configured at the master node. Alternatively, it can be network event-based such as link failures or a sudden change in bandwidth. When such an event occurs, the master node notifies the appropriate nodes and the network will be auto-configured accordingly. The network auto-configuration can happen in several ways. For example, an IMS node can notify the mobile node about a role change provided the mobile node subscribes to an event after registration. This event could be defined as a function that indicates the change of role for an IMS node. SIP Event notification messages such as SUBSCRIBE and NOTIFY may be used for this event change notification. The role assignment algorithm on the other hand can be implementation specific.

Protocol Interaction Between Nodes

To allow deployment of self-organizing IMS networks, protocol interactions among different IMS nodes are necessary. As may be appreciated, these interactions are among and between IMS nodes and mobile nodes, and among and between the master node and IMS nodes.

Node Monitoring

To allow the Master Node to determine the functional behavior of all the other nodes in the network, a periodic message (heartbeat) is sent to all known nodes. If a response is not forthcoming from a given node within a specific time, the given node is marked as troubled or failed, and the master node will then distribute its functionality to the remaining nodes dynamically.

With the above principles in place, we may now describe any functionality supported by each node involved in a self-organizing IMS network according to an aspect of the present disclosure.

Operations of the Master Node

Figure 3A:
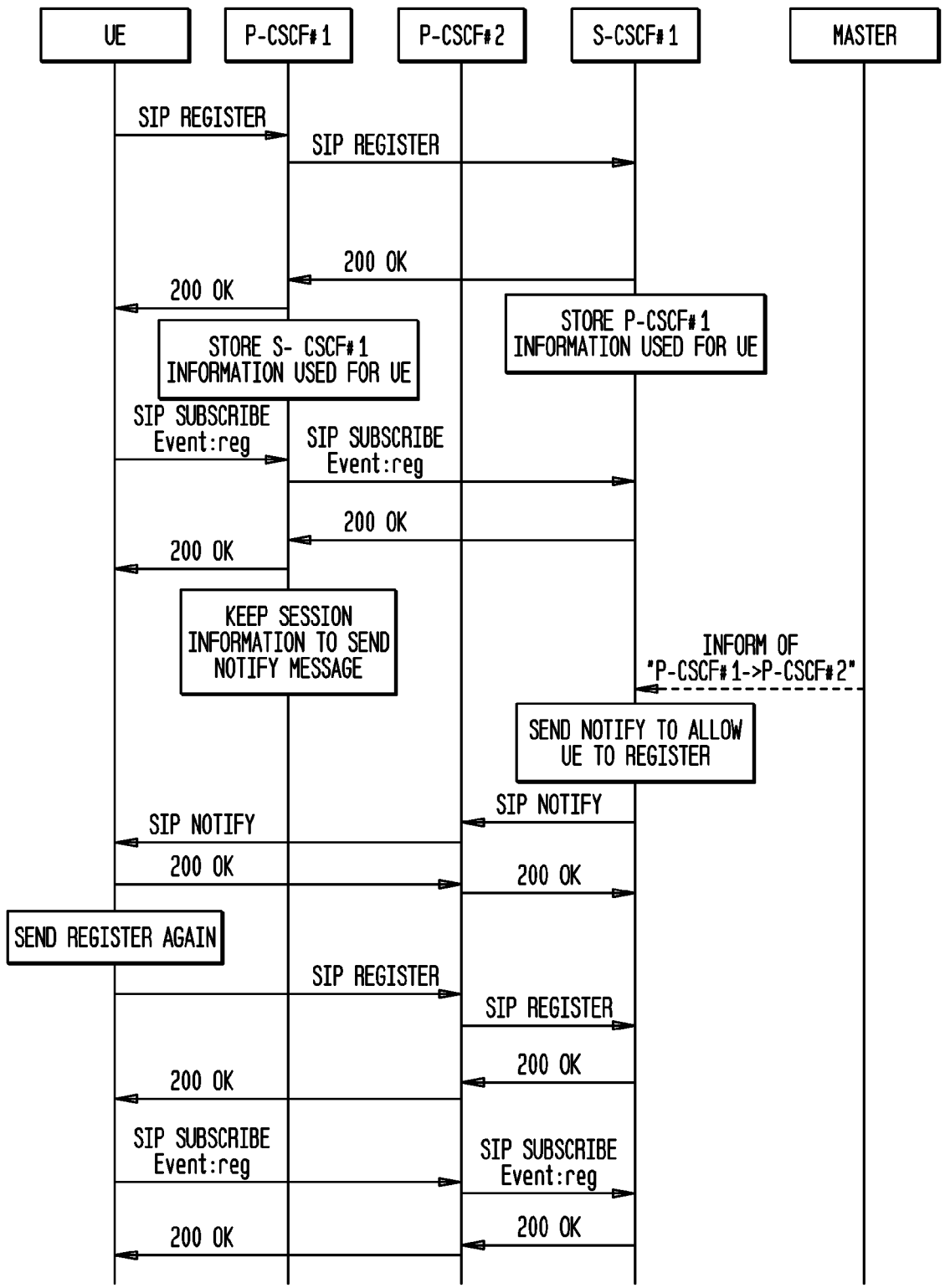
FIG. 3($a$) is a schematic diagram showing the role of a master node during a Proxy-Call Session Control Function (P-CSCF) change according to an aspect of the present disclosure.

The master node is a main component of the centralized approach to IMS networks: In addition to assigning roles to nodes, it has other functions depending on the type of event. With reference to FIG. 3(a) there is shown the role(s) of a master during a P-CSCF change according to an aspect of the present disclosure.

As the example shows, if the P-CSCF (e.g., P1) role changes, the Master Node notifies all of the S-CSCF nodes and provides them information about the new P-CSCF. When an S-CSCF receives this notification, it—in turn—establishes a list of mobile nodes assigned to the P-CSCF and notifies them by way of the new P-CSCF (e.g., P2) (Receive Role Change).

We note that Mobile node (MN) and User Equipment (UE) are used interchangeably and have the same meaning as used herein. The notification message sent by S-CSCF to the mobile nodes contains information about the new P-CSCF. Upon receipt of notification from the S-CSCF, mobile nodes re-register to the new P-CSCF and re-subscribe to event state change for future changes.

Conversely, if the S-CSCF role changes the master node notifies all P-CSCF nodes followed by notification of mobile nodes. Such notification message includes information about the new S-CSCF.

Upon receipt of this notification message, a mobile node re-registers and subscribes to event state change. To handle load balancing, the master node may request each of the IMS components to support a given percentage of mobile nodes previously attached to the IMS node with role change functionality.

We note that re-registering as used in this example does not have the same meaning as would be applied in, for example, a Session Initiation Protocol (SIP) example. Re-register as used herein means that this MN was already registered and registers once again. Messages for this new registration will not go through the I-CSCF.

Figure 3B:
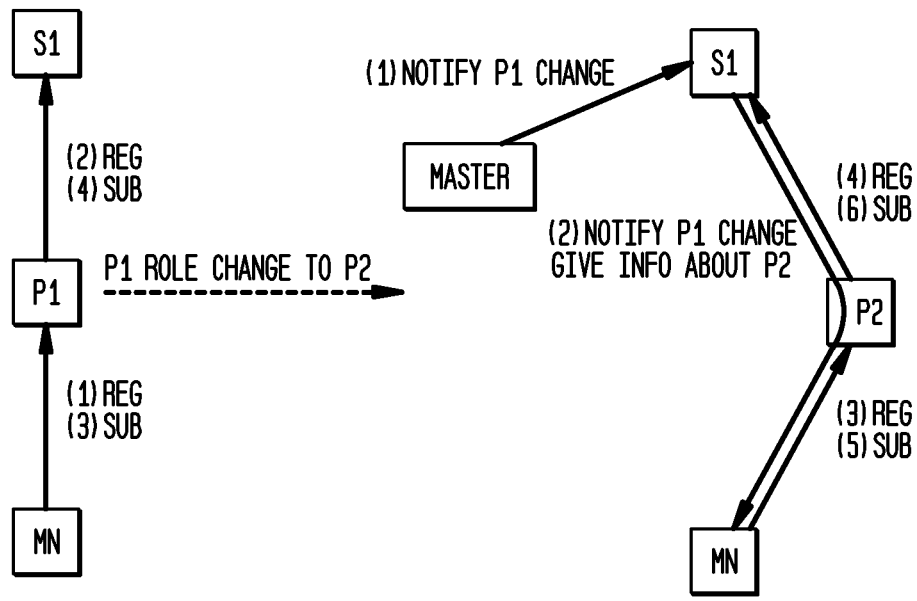

FIG. 3(b) illustrates the notification of a P-CSCF role change by a master node. Upon receipt of a NOTIFY message, P2 forwards this message. It matters not whether the Router-Header is correctly set or not. Although SIP routing state changes in this example, the ongoing session is not affected.

On the other hand, if the S-CSCF role changes, the master node notifies all P-CSCF followed by notification of any Master Nodes. The notification message includes information about the new S-CSCF (See, e.g., FIG. 3(f)). As may be appreciated, P1 need not re-discover S2 due to event change. In other words, P1 does not query the I-CSCF to locate the S-CSCF serving the MN.

Figure 3C:
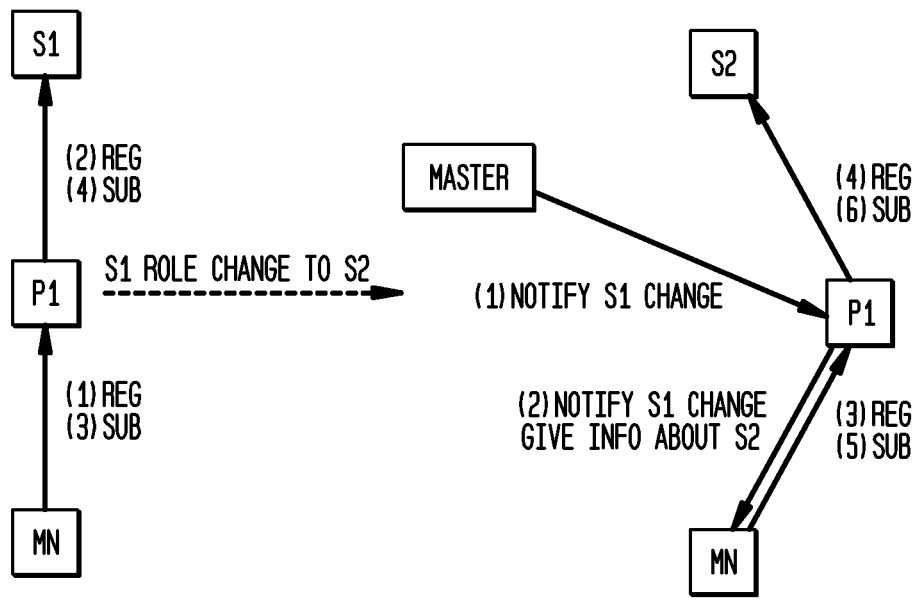
Figure 3D:
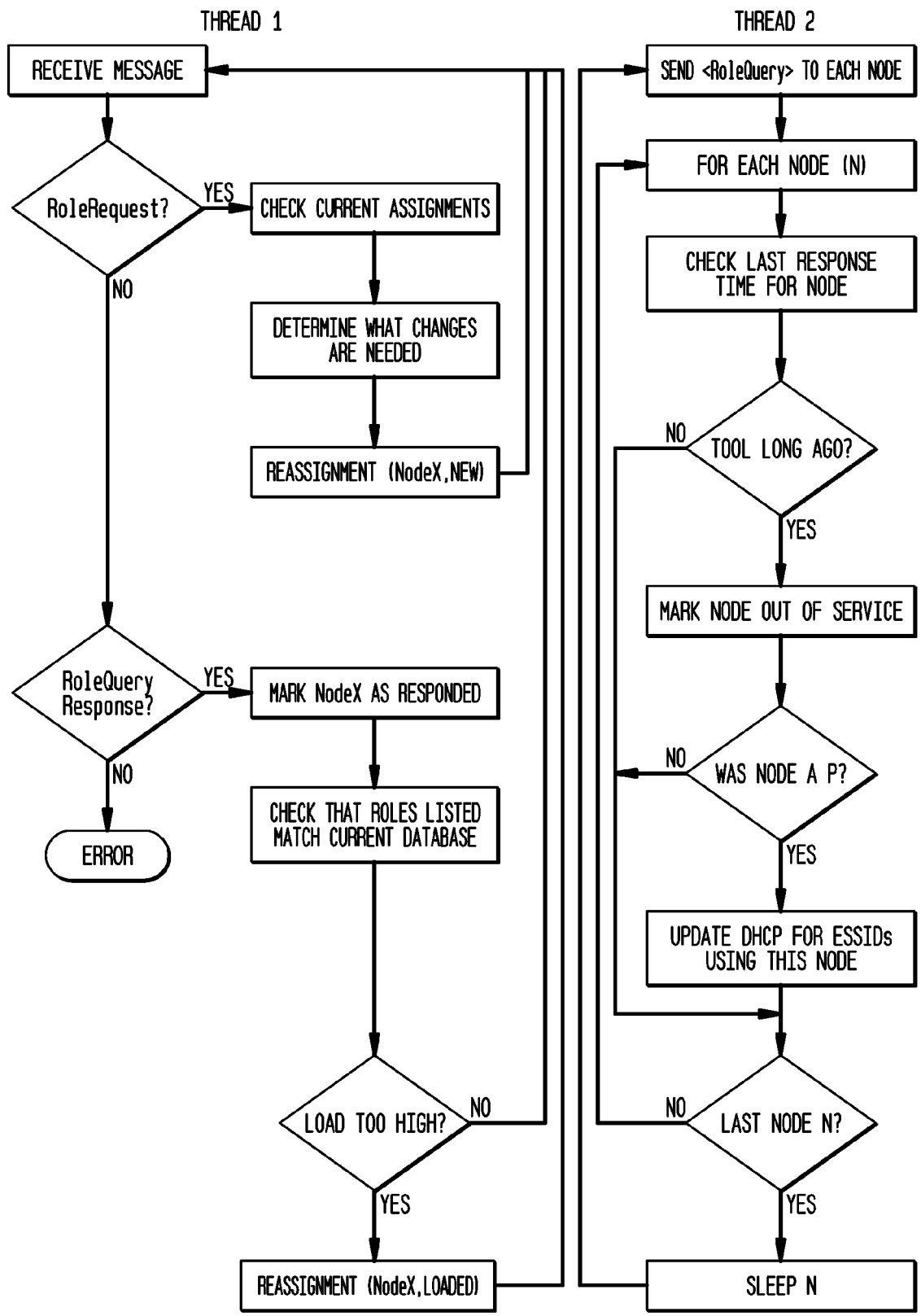
Figure 3F:
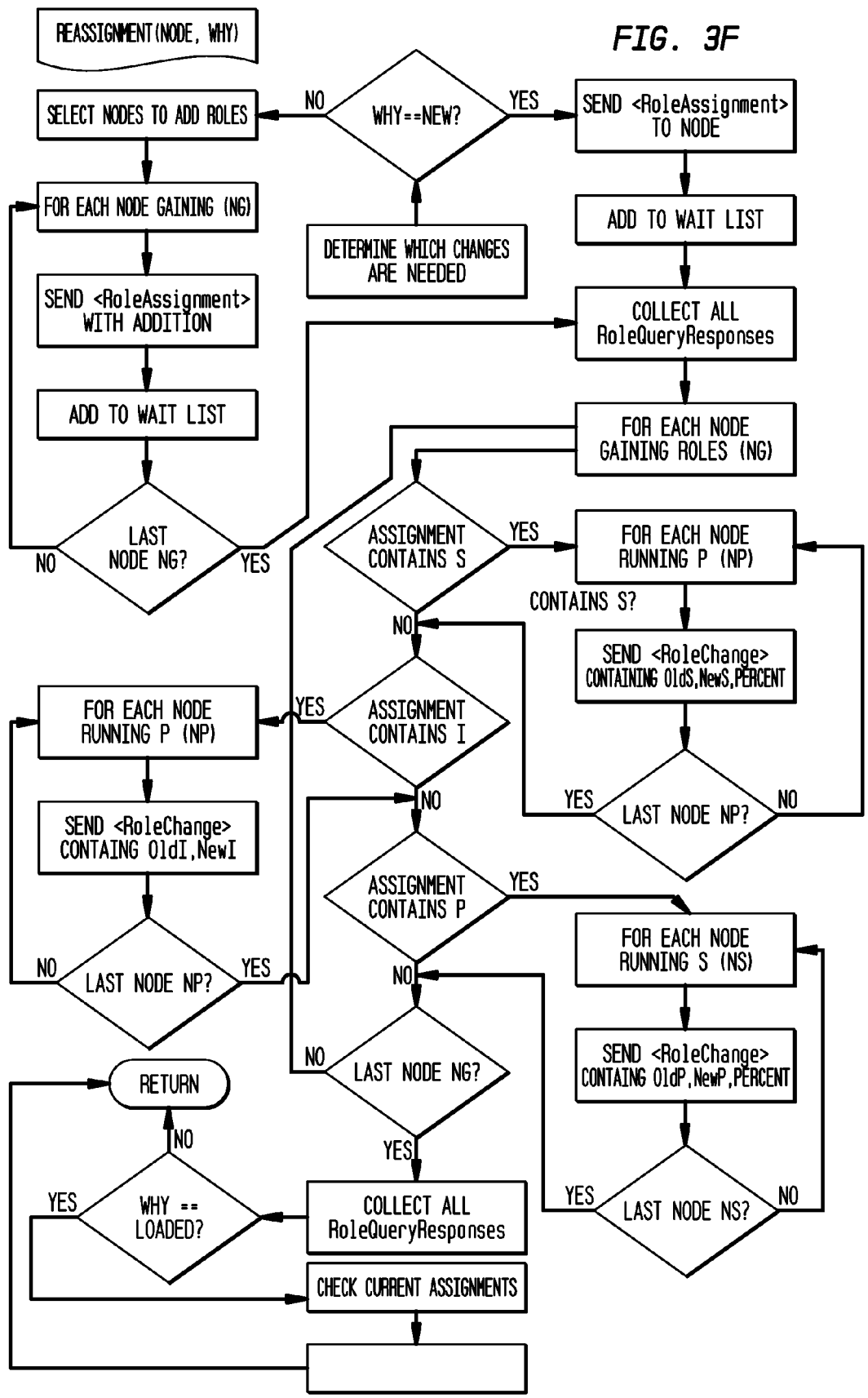

FIG. 3(c) shows a high level overview of the procedure when the S-CSCF role changes. Upon receipt of the notification message, the MN "re-registers" and subscribes to event state changes. Note that communication between the Master Node and IMS components is based on UDP with acknowledgement. To handle load balancing, the MN may request that each MS component support a given percentage of the MNs previously attached to the IMS node with role change. FIG. 3(d) is a flow chart showing the overall Master Node Operations, FIG. 3(e) is a pseudocode listing showing the operation of the Master Node, FIG. 3(f) is a flow chart showing the overall role assignment, and FIG. 3(g) is a pseudocode listing showing the overall role assignment.

Operations of IMS Node

Figure 3H:
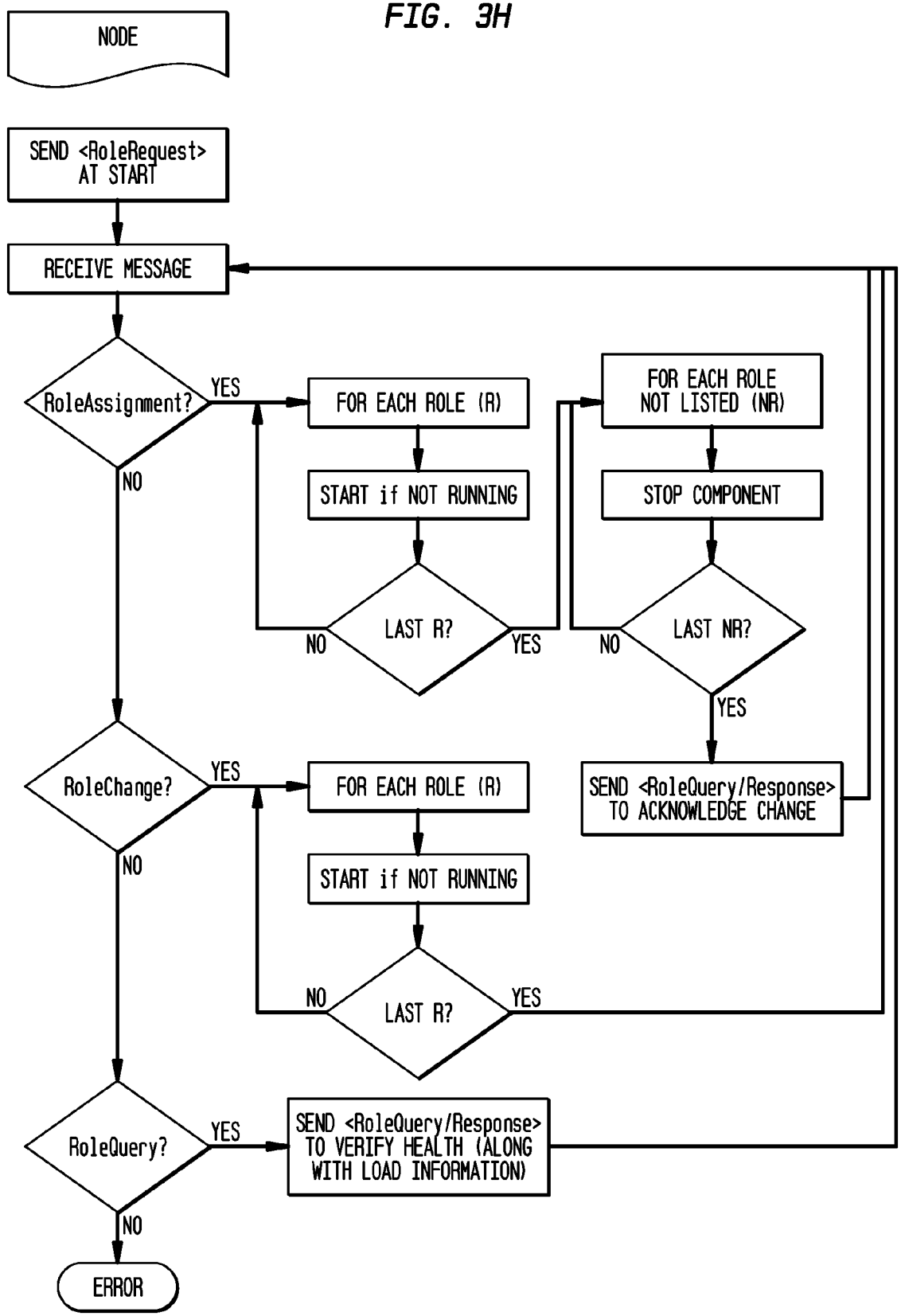

IMS Nodes—for example S-CSCF, P-CSCF—or components—must be able to support a number of operations consistent with their function(s). FIG. 3(h) is a flow chart showing IMS node operation mode for self-organizing IMS networks according to an aspect of the present disclosure. In addition to the function(s) shown, an IMS node should also respond to periodic role queries as acknowledgement of its availability. A pseudocode listing of IMS node operation is shown in FIG. 3(i).

Operations of Mobile Node

As may now be appreciated by those skilled in the art, the operation of the mobile node is based on SUBSCRIBE/NOTIFY methods. With such methods, the mobile node will receive and process a notification message (NOTIFY) received either from an S-CSCF when the P-CSCF role changes or from a P-CSCF if the S-CSCF role changes. Upon receipt of this NOTIFY message, the mobile node uses this information to register and subscribe again to event change.

Figures 3J, 3K:
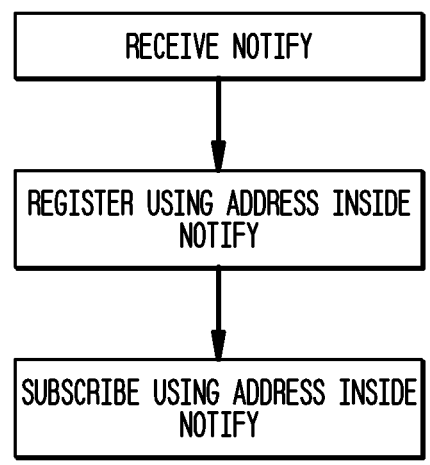
Figure 3L:
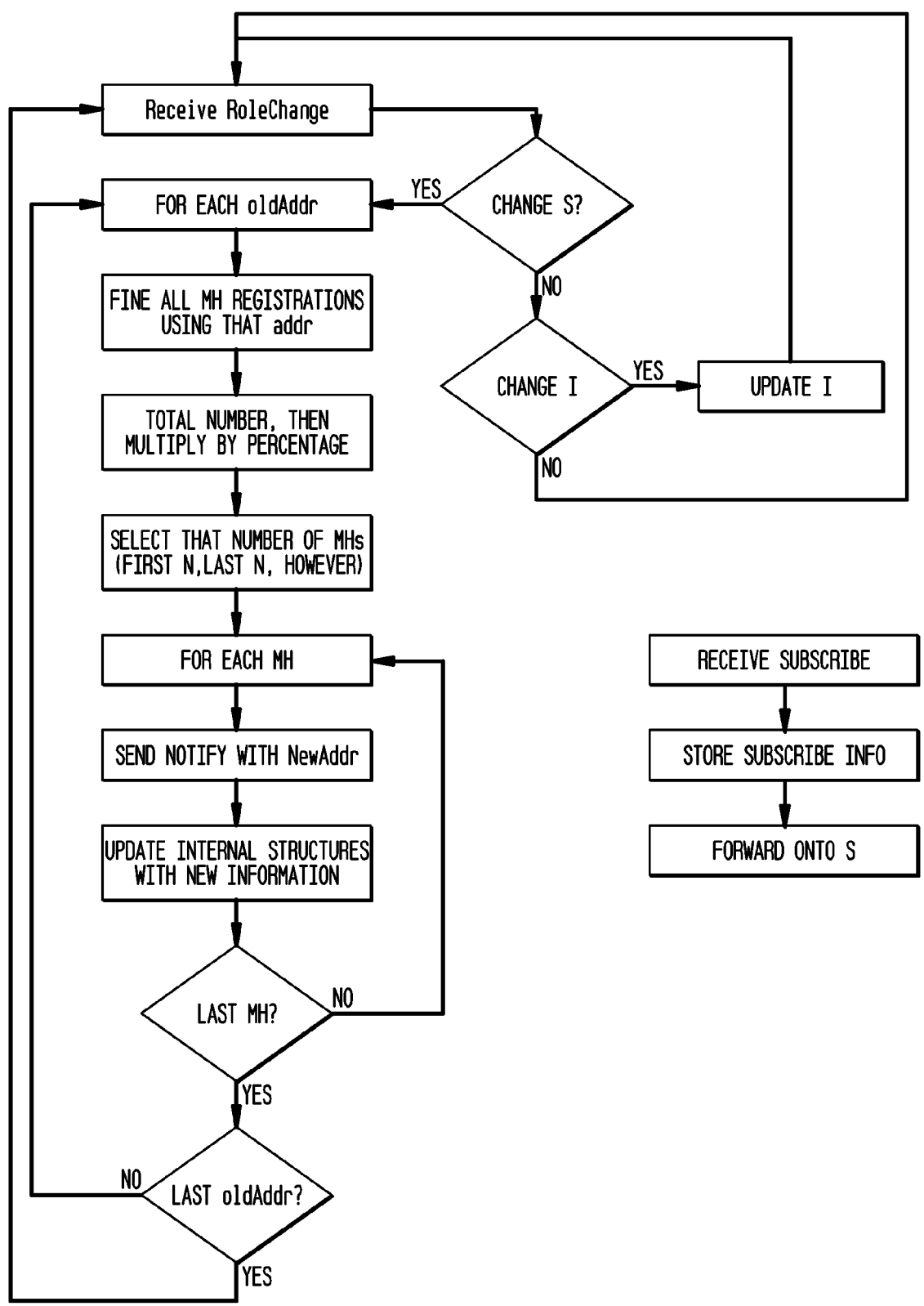

Importantly with such a method the Mobile node's ongoing session—including the QoS of the media—is not affected since the access network that the mobile node is attached to is not changing. However, if the mobile node needs to establish a new session, it should include the Replace-header field in the INVITE message or use re-INVITE message. FIG. 3(j) is a flow chart showing the operations required of a mobile node in a self-organizing IMS while FIG. 3(k) is a pseudocode listing of those operations.

Operation of the P-CSCF

With self-organizing IMS networks such as those contemplated by the present disclosure, P-CSCF components should support the following additional operations:

Receive notification of role change from the master node;
Proxy and store mobile node's subscription information during SUBSCRIBE operation;
Send NOTIFY message with information about the new S-CSCF;
Retrieve all mobile nodes registered to S-CSCF upon receipt of event change from the Master Node;
Process mobile node's re-registration request after a role change event; and
Do not query the I-CSCF when a mobile node re-registers after a role change event.

A flow chart showing the operations performed by P-CSCF is shown in FIG. 3(f), and a pseudocode listing for P-CSCF is shown in FIG. 3(m).

Operation of the S-CSCF

Similarly, self-organizing IMS network S-CSCF components should support the following additional operations:

Receive notification of role change from the master node;
Store mobile node's subscription and profile information;
Send NOTIFY message with information about the new P-CSCF;
Retrieve all mobile nodes registered to the P-CSCF upon receipt of event change from the Master Node;
Update HSS with the mobile node information after the role change.

Figure 3N:
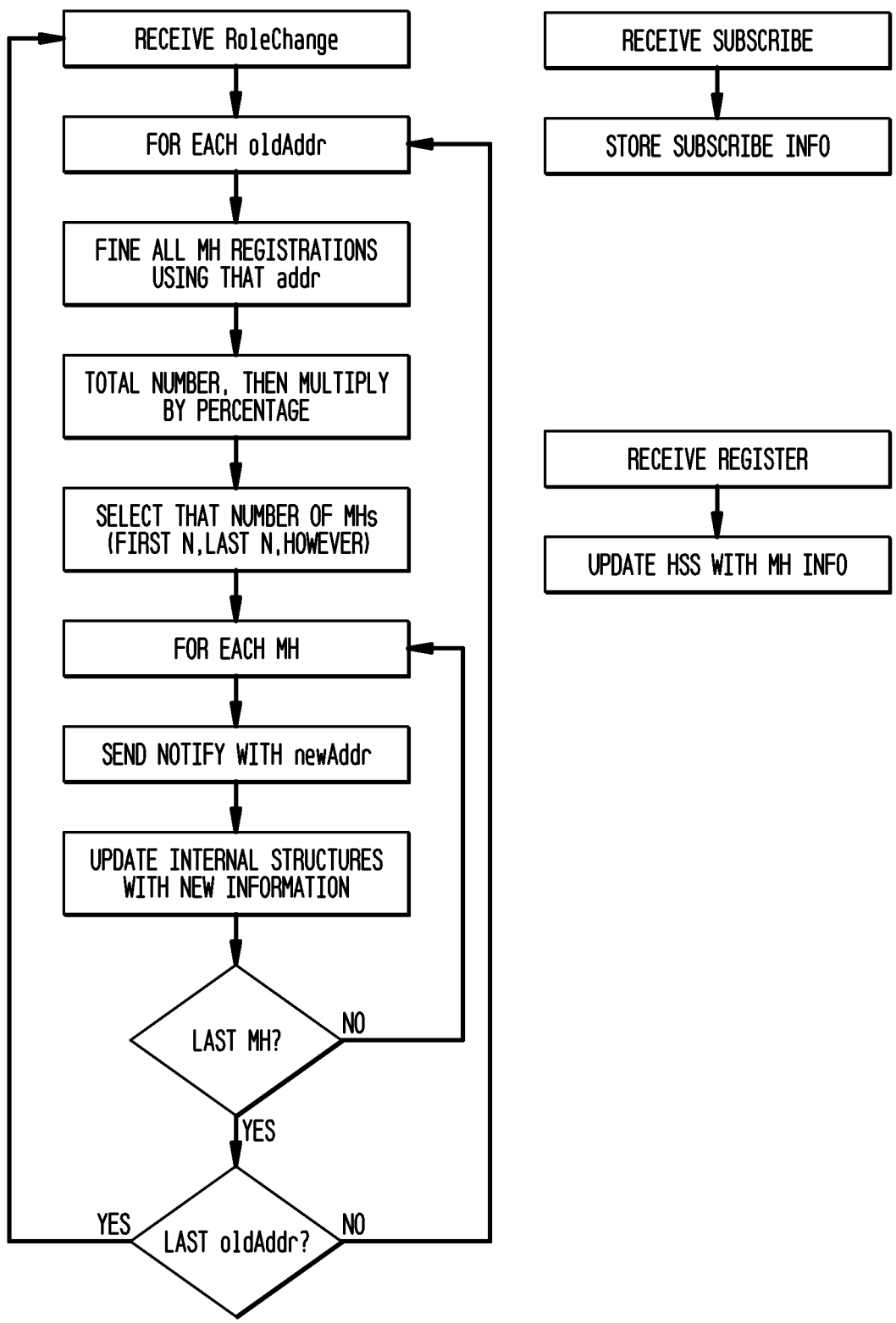

A flow chart showing the operations performed by S-CSCF is shown in FIG. 3(n), and a pseudocode listing for P-CSCF is shown in FIG. 3(o).

Implementation

We may now describe and illustrate several exemplary migration scenarios of functional components to achieve a self organizing IMS network according to an aspect of the present disclosure. We may then describe associated call flows and describe an exemplary, prototype test-bed.

Figure 4:
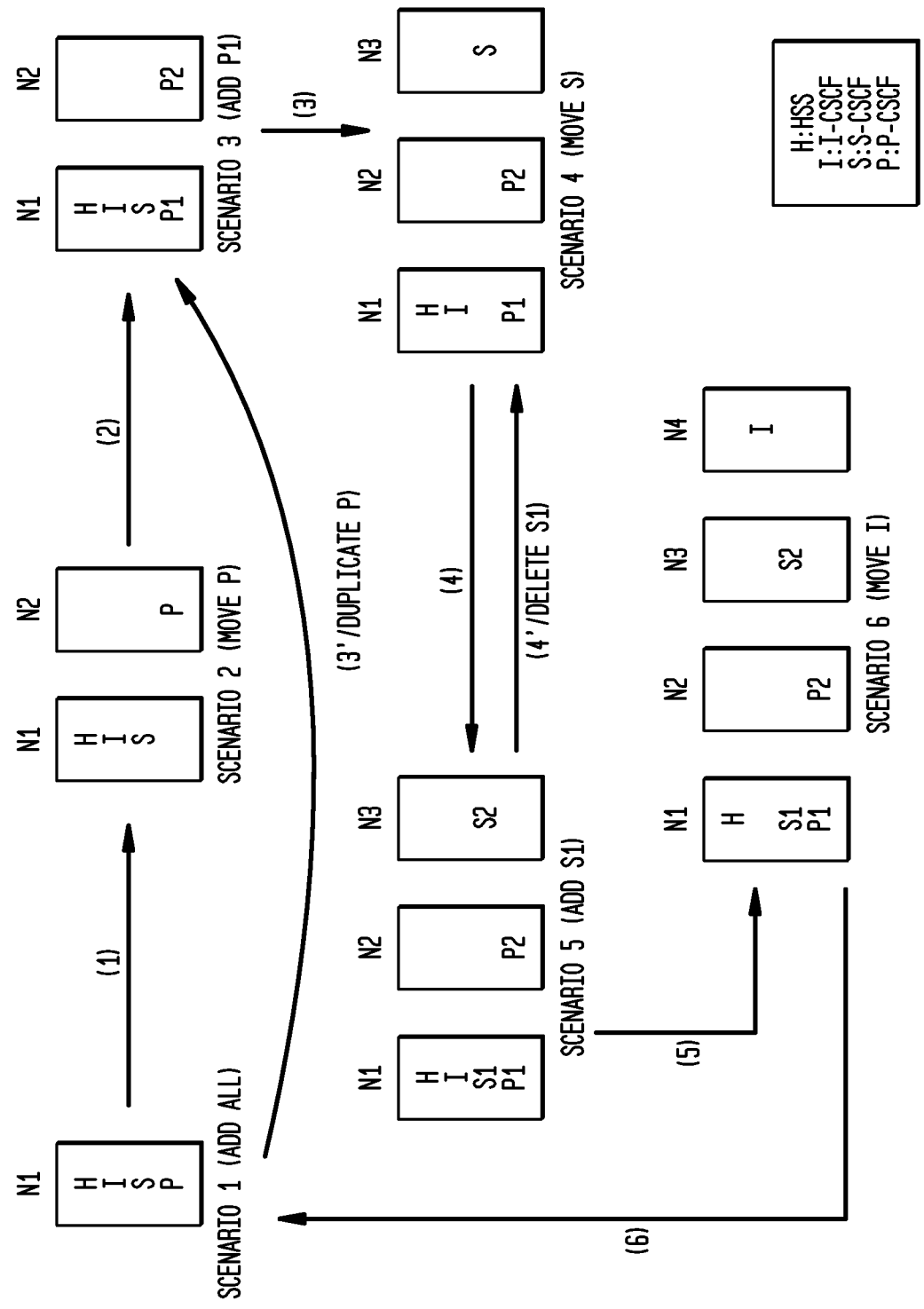
FIG. 4 is a schematic diagram showing possible, exemplary reconfiguration scenarios for IMS nodes according to an aspect of the present disclosure.

Ideally, self organizing IMS should support reconfiguration(s) in the network such as that shown in FIG. 4. Notably, as used in FIG. 4, "H" means HSS, means "I-CSCF", "S" means S-CSCF and "P" means P-CSCF.

For example—and with reference now to that FIG. 4—Scenario 1 depicts a situation in which all IMS components functioning in a single node, namely N1.

Scenario 2 shows a situation in which P-CSCF functionality is migrated to node N2.

Scenario 3 shows a situation in which P-CSCF functionality is split across two nodes, namely nodes P1 (Node N1) and P2 (Node N2).

Scenario 4 depicts a situation in which S-CSCF functionality is relocated to a different node.

Scenario 5 depicts a situation in which S-CSCF functionality gets split across two nodes, namely S1 (node N1) and S2 (Node N3).

Scenario 6 depicts a situation in which I-CSCF's functionality getting migrated to a new node (N4), and finally, the transition step (6) shows the merging functionality where all the functions merge within a single node (N1).

It is important to note that one goal of an IMS according to the present disclosure is to not affect end users (whether they have an ongoing session or initiate a new session) due to changes in configuration within the network.

Figure 5:
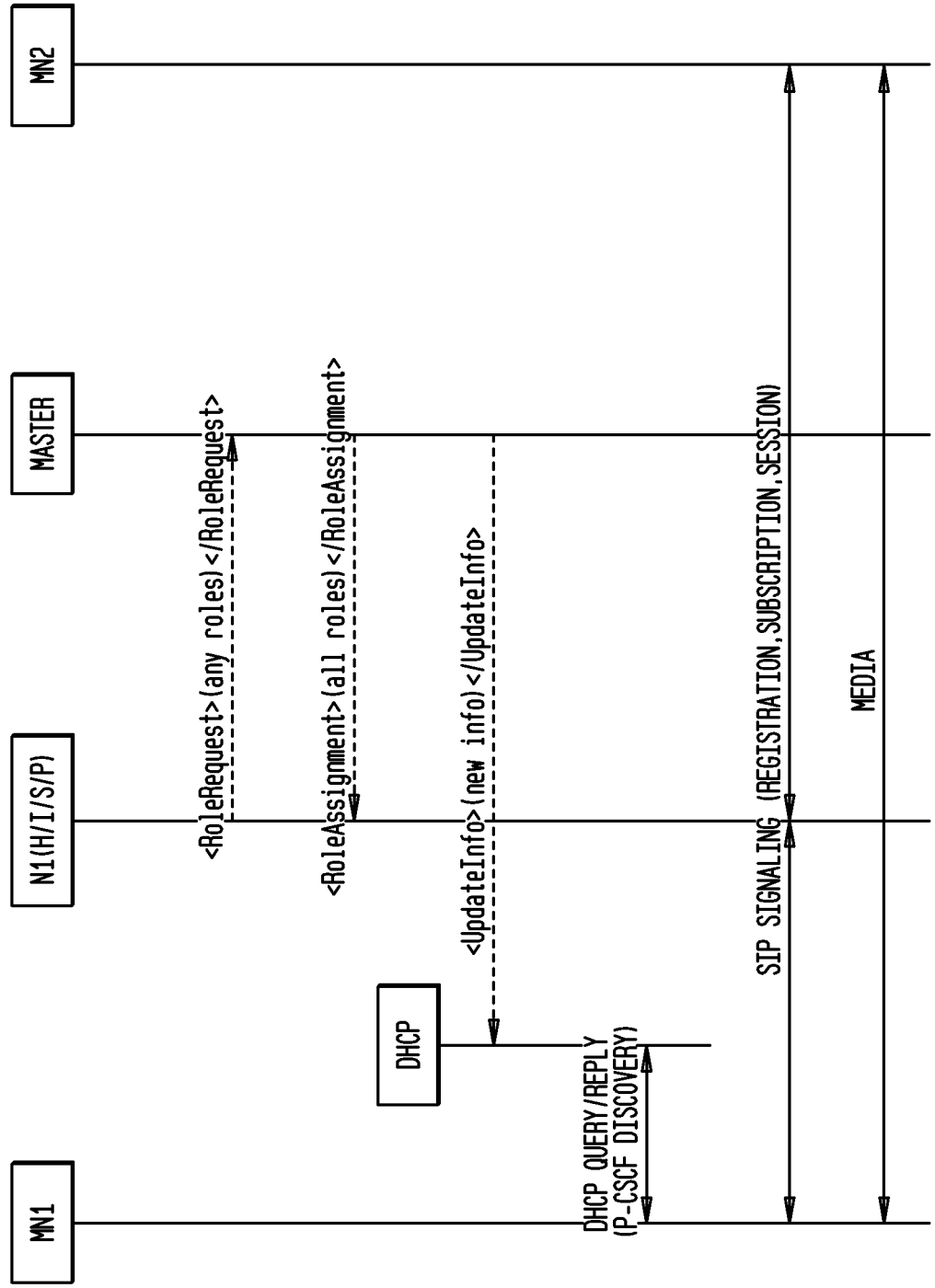
FIG. 5 is a schematic diagram of an exemplary call flow for a scenario wherein all SIP-based IMS components are deployed in the same node according to an aspect of the present disclosure.

With these scenarios outlined in FIG. 4, we may now describe an exemplary call flow for scenario 1, where all SIP-based IMS components (i.e., HSS, S-CSCF, I-CSCF, and P-CSCF) are deployed in the same node. In this scenario, mobile node 1 (MN1) and mobile node 2 (MN2) register with Node 1 (N1) and a call session is established between them. The representative call flow for this scenario 1 is shown in FIG. 5. To allow deployment of self-organizing IMS networks, after registration, mobile nodes must subscribe to S-CSCF and P-CSCF for the role change event.

According to the present disclosure, we use a MESSAGE method for any communication between the mobile node and the master node. Accordingly, the exchange between the IMS node and master node that establishes the initial capabilities of the node and role assignment functions are performed using the MESSAGE method.

Turning now to FIG. 6, there is shown a sample MESSAGE method showing "Role Request" and "Role Assignment". As part of role request, the IMS node offers its capabilities in terms of CPU, memory, and load. Role Query response is not shown.

Figure 7:
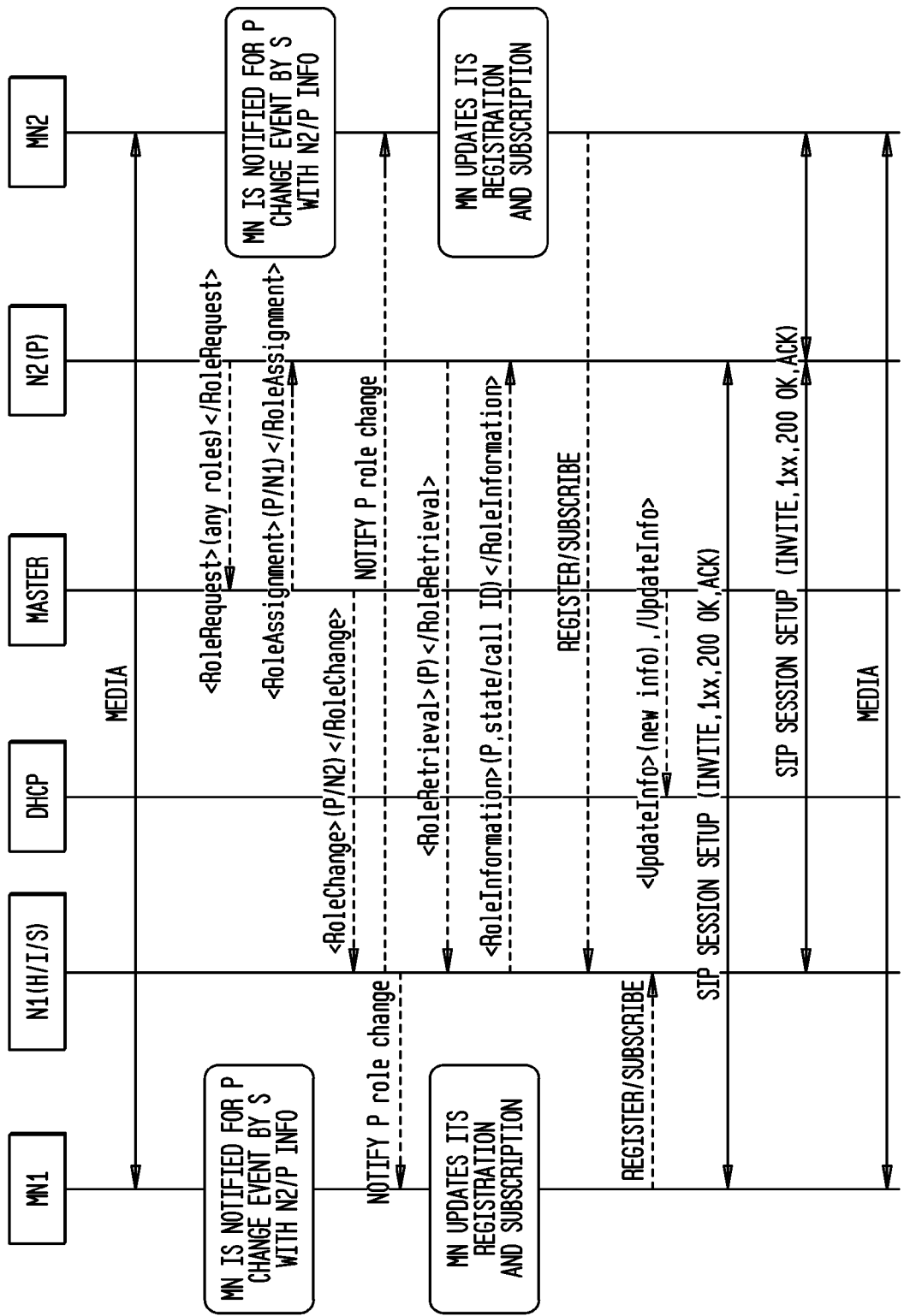
FIG. 7 is a schematic diagram of an exemplary call flow showing P-CSCF according to an aspect of the present disclosure.

FIG. 7 shows exemplary call flows for scenario 2 as depicted earlier in FIG. 4. That scenario 2 call flow shown in FIG. 7 corresponds to that case in which P-CSCF functionality is relocated in a new node (i.e., Node 2 (N2)) while HSS, S-CSCF, and I-CSCF remain in Node 1. In such a scenario—when Node 2 comes online—it exchanges its capability information with the Master Node and it is found that Node 2 has the ability of serving as P-CSCF.

Hence, the master node decides to transfer or move the P-CSCF functionality to Node 2 which acts now as P-CSCF for both mobile node 1 and mobile node 2.

The procedure is described as follows:

The old IMS Node (N1) is providing the IMS functionalities for the Mobile Node.

When a new IMS Node (N2) comes online, it sends a request to the Master Node for role assignment. According to the capabilities provided in the role request response message, the master node decides the role assignment to N2 governed by the operator policy. The master node provides information about the current IMS entity if the role has been already assigned to other IMS nodes.

Upon deciding on the role assignment, the Master Node notifies the S-CSCF (N1/S) about role assignment changes and provides information about the new IMS Node (N2/P). The S-CSCF will notify all mobile nodes registered to the previous P-CSCF.

The new IMS Node (N2/P) retrieves information (state or context) from the old IMS Node (N1).

In order to allow new mobile nodes to discover the correct P-CSCF, the Master Node updates the DHCP server configuration.

Figure 8:
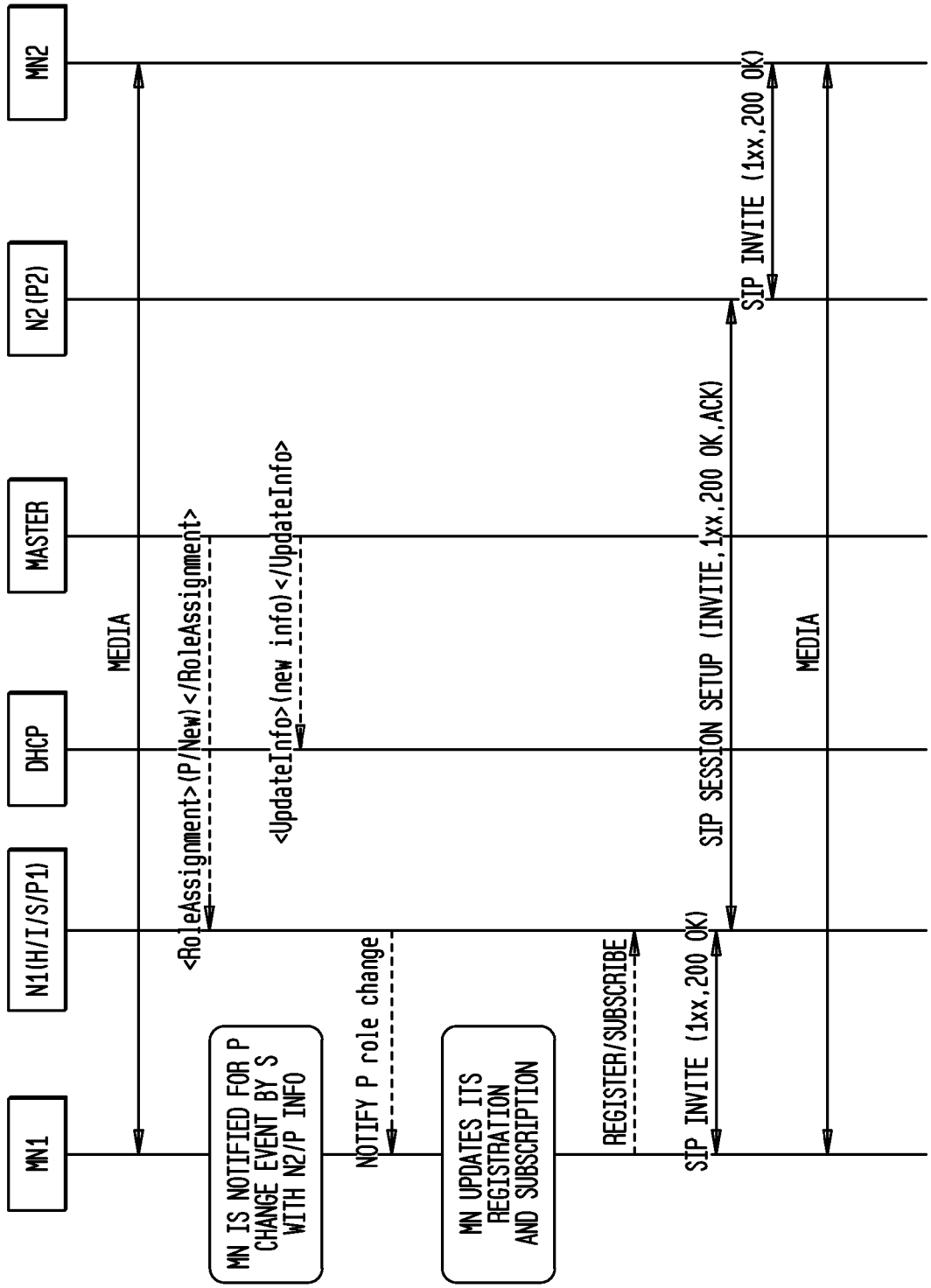
FIG. 8 is a schematic diagram of an exemplary call flow showing Serving-Call Session Control Function (S-CSCF) is split into two nodes.

Scenario 3 depicts that situation in which P-CSCF functionality is split among two nodes (P-CSCF1 in Node 1 and P-CSCF2 in Node 2). In this example scenario, the Master Node assigns P-CSCF role to Node 1 while earlier the P-CSCF role is resident in Node 2 (from Scenario 2). Additionally, mobile node 1 is assigned to Node 1 as its P-CSCF (i.e., P-CSCF1) while mobile node 2 is assigned to Node 2 as its P-CSCF (i.e., P-CSCF2). Upon completion of these steps, a call session is established between mobile node 1 and mobile node 2. Note that the P-CSCF functionality splits happen after the initial registration of mobile node 1 and mobile node 2. In other words, mobile node 1 and mobile node 2 were associated to the same P-CSCF (Node 2). The call flow for this scenario 3 is shown in FIG. 8.

Figure 9:
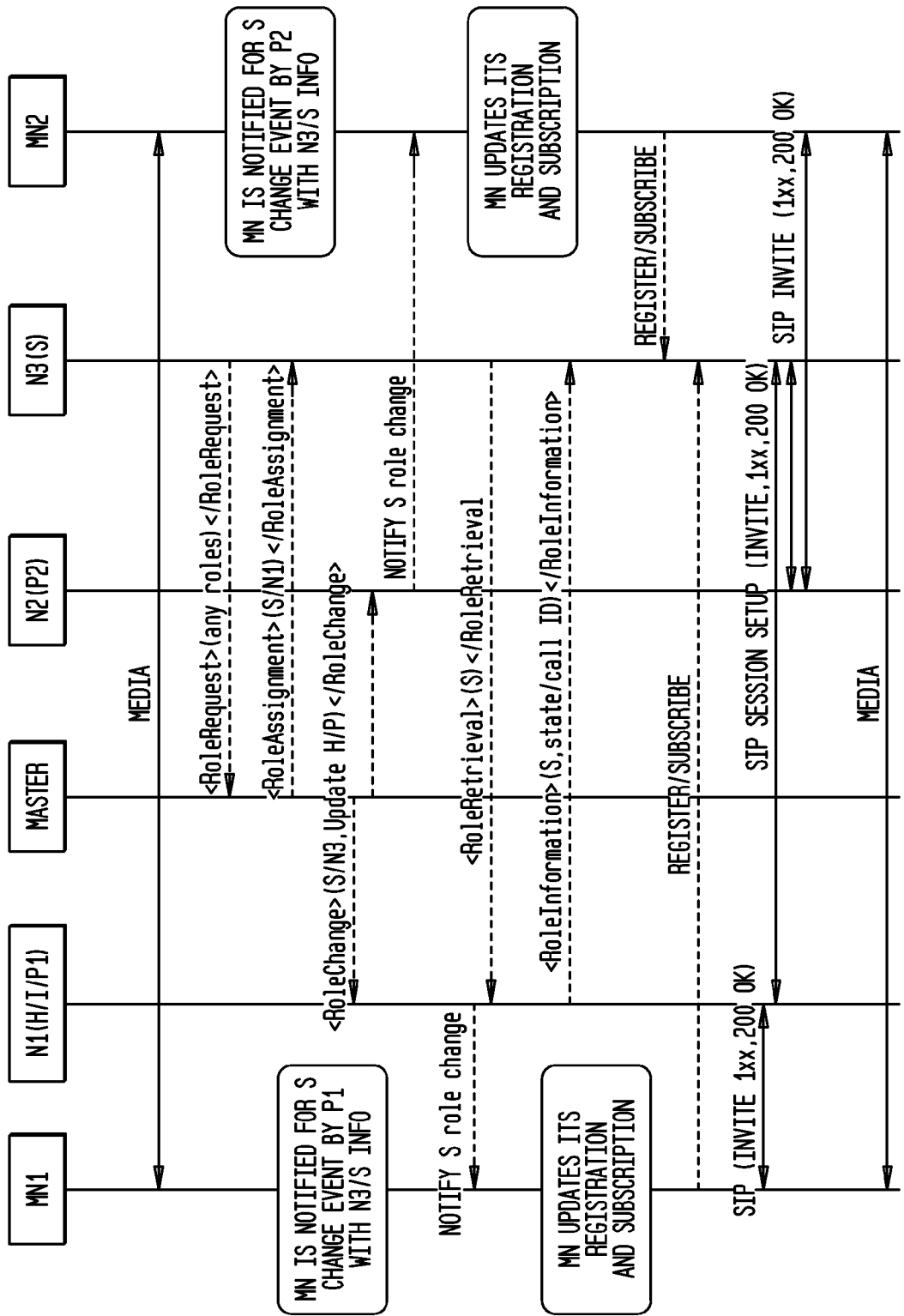
FIG. 9 is a schematic diagram of an exemplary call flow showing Serving-Call Session Control Function (S-CSCF) relocation according to an aspect of the present disclosure.

Turning now to FIG. 9, there it shows the call flows for scenario 4 which correspond to the situation in which S-CSCF functionality is relocated in a new node (i.e., Node 3). In this exemplary scenario, when Node 3 comes online, it exchanges its capability information with the Master Node and it is found that Node 3 is suitable for serving as S-CSCF. Then, S-CSCF functionality of Node 1 is transferred to Node 3 and Node 1 (i.e., P-CSCF, HSS or I-CSCF) is notified for this change.

As shown in that FIG. 9, transition step (6) depicts a situation when IMS main nodes (P-CSCE, S-CSCF) functionalities move back to one node due to failure of other nodes or load balancing reasons. The Master Node detects this state change or event and restores all functionalities previously supported by each IMS node to Node 1. Mobile node 1 and mobile node 2 re-register with Node 1 again. Before making such merging decision in one node, the Master Node needs to consider several factors such as, time to restore the functionalities and service disruption.

Figure 10:
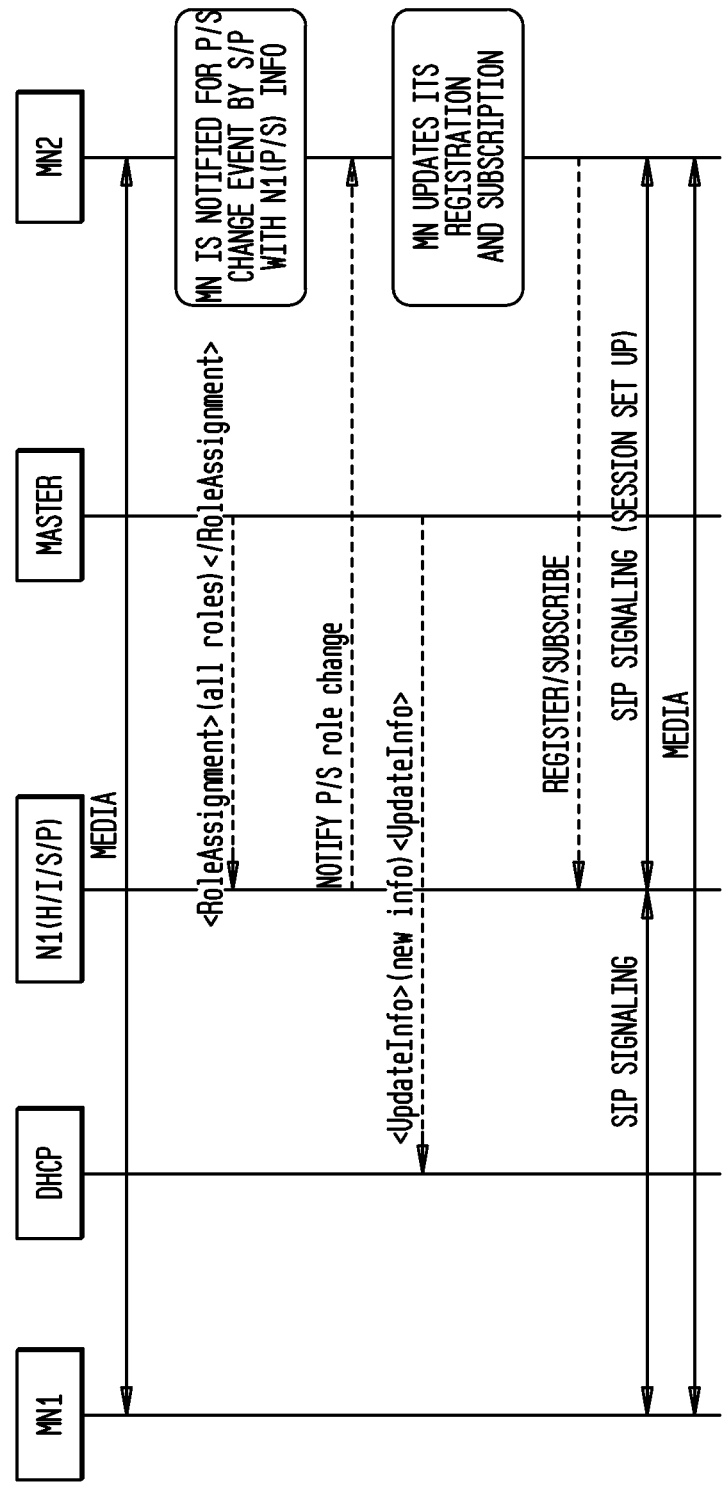
FIG. 10 is a schematic diagram of an exemplary call flow showing what may happen when other IMS nodes stop working.

The call flow depicting the sudden migration of all IMS nodes, for example from scenario 6, stop working due—for example—to a failure or of hardware issues is shown in FIG. 10. The master node detects this state change or event and restores all functionalities previously supported by each IMS node to Node 1. MN 1 and MN 2 re-register with Node 1.

Figure 11:
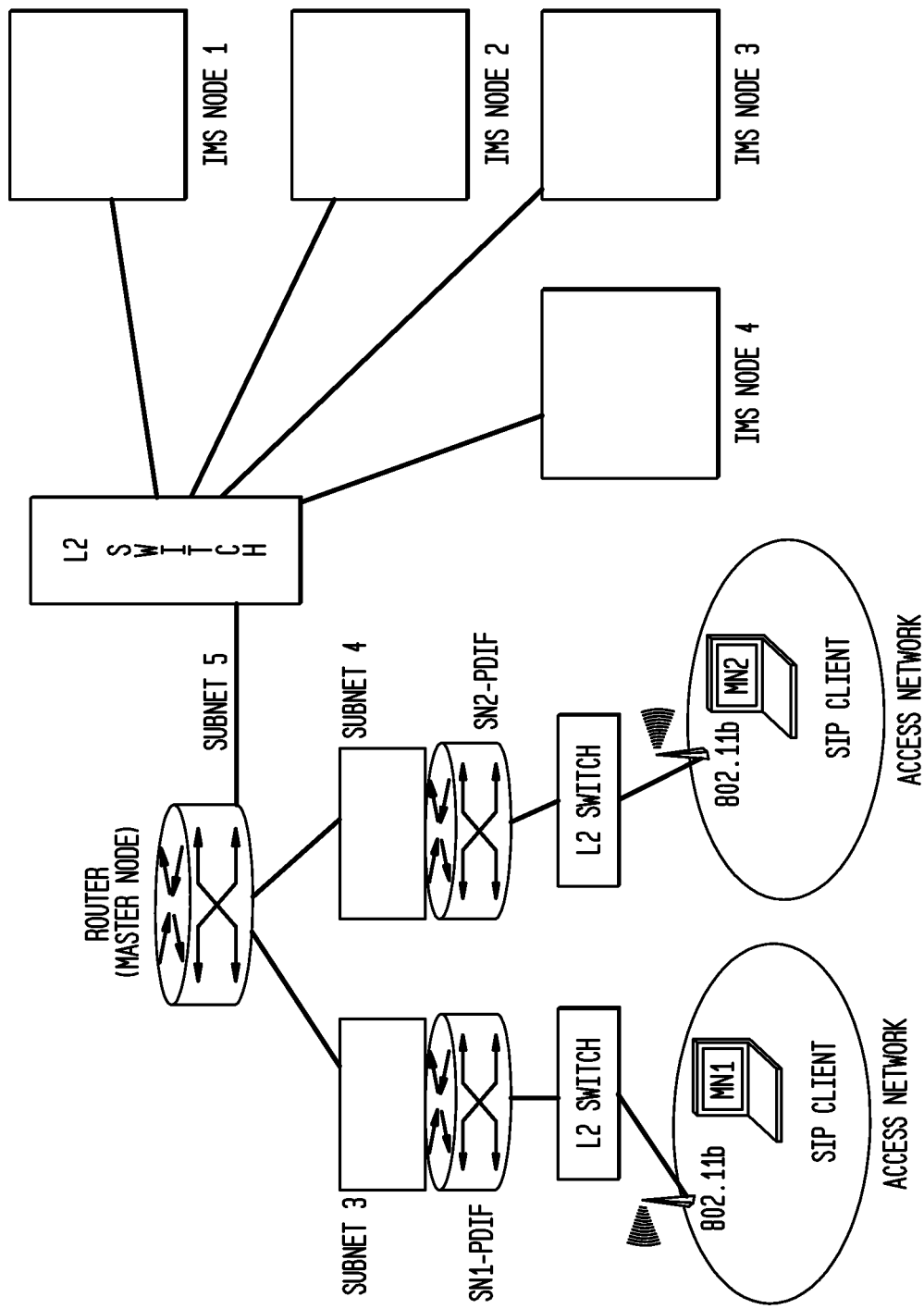
FIG. 11 is a schematic diagram of a self-organizing IMS test bed according to an aspect of the present disclosure.

FIG. 11 shows the functional components employed in a representative, in experimental test-bed. All components in the test-bed are Linux-based and there are two subnets (access networks) and one home network. The home network is equipped with all SIP-based IMS components: HSS, I-CSCF, S-CSCF and P-CSCF. All IMS functionalities can run in the same node. The master node is located in the router that also acts as the DNS server as well as DHCP server. The edge routers act as 3GPP's PDIF (Policy Decision and Information Function) and DHCP relay agent. As shown a "dibbler" as a DHCP client on the mobile. P-CSCF discovery procedure is based on DHCP as specified by standard IMS. We have used XML-based query-response mechanism to obtain the required information from the master node and for role assignment.

A SIP stack used in the test-bed is based on NIST implementation. Mobile nodes use SIP user agent based on SIP Communicator to communicate with the IMS nodes. Mobile nodes communicate with the DHCP server that resides in the router via the DHCP relay agent in the edge router in order to obtain the IP address and discover SIP servers.

FIGS. 12A-12D illustrate exemplary screen shots of different operations in the test-bed. As shown, FIGS. 12A-12D illustrate the specific functionality (e.g., P-CSCF, S-CSCF, I-CSCF) and whether the current node is active. In operation, light cross-hatching indicates active while dark cross-hatching indicates that the nodes are inactive.

Figure 12A:
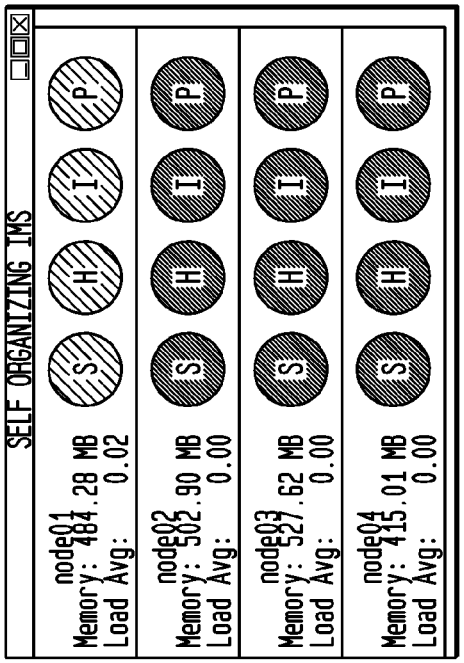
FIGS. 12A-12D illustrate a set of representative exemplary screen shots showing a self-organizing IMS according to an aspect of the present disclosure.
Figure 12C:
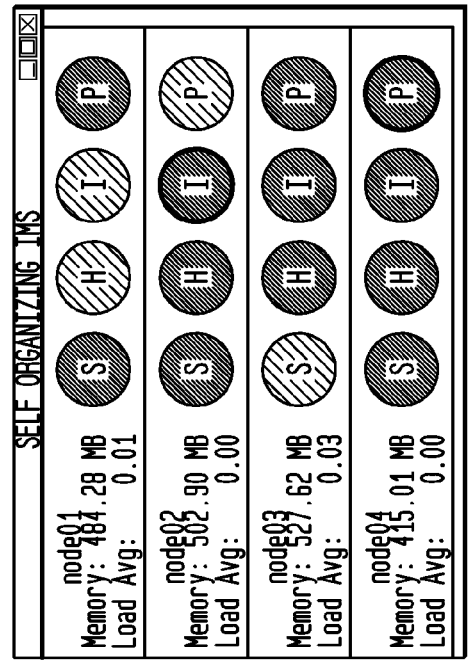
Figure 12B:
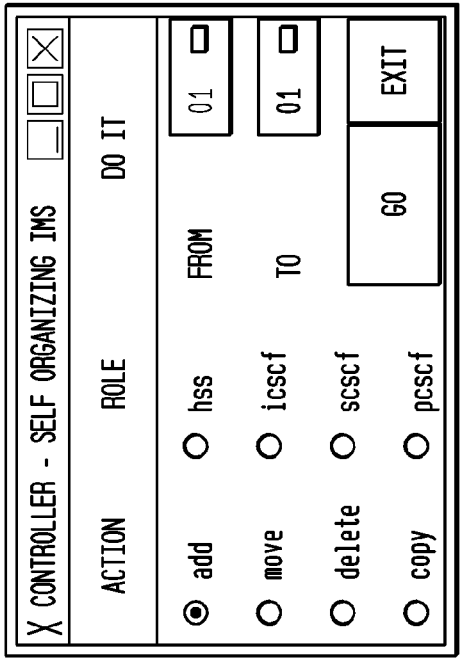
Figure 12D:
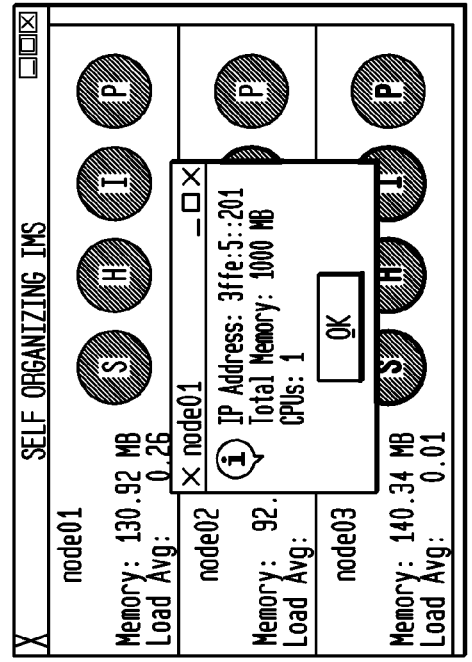

FIG. 12A illustrates a controller screen. FIG. 12B illustrates that IMS nodes are online. FIG. 12C illustrates that initially all IMS functions are running in Node 1. FIG. 12D illustrates that some changes in network condition migrate some of these functionalities to Node 2 (e.g., P-CSCF) and Node 3 (e.g., S-CSCF). Preliminary performance results for server reconfiguration indicate that it takes less than one second to re-assign the respective server functionalities by the Master Node. This reconfiguration time plays an important role in determining the extent of service interruption. We are implementing both UE (mobile)-involved and UE (mobile)-non-involved cases to realize the self-organizing IMS. The UE-involved case requires that the mobile is involved in the signaling exchange during the reconfiguration process. The UE-non-involved case does not require the mobile's involvement during network node reconfiguration network entities such as a load balancer and SIP proxies help re-registering the mobile when the network components change their roles.

At this point, while we have discussed and described the disclosure using some specific examples, those skilled in the art will recognize that our teachings are not so limited. More particularly, self organizing IMS is an important step towards the successful deployment of IMS networks. A policy-based configuration and reconfiguration of IMS components will help operators reduce the cost and complexities of current networks. Our approach is self adaptive in the sense that we preserve the basic IMS node functionalities with network and operational environment change. Accordingly, the invention should be only limited by the scope of the claims attached hereto.

What is claimed is:

1. A self-organizing network architecture providing Internet Protocol Multimedia Services, the architecture comprising:

a plurality of interconnected nodes, each one of said nodes providing one or more services selected from the group consisting of: Serving-Call Session Control (S-CSCF), Interrogating-Call Session Control (I-CSCF), Proxy-Call Session Control (P-CSCF), Home Subscriber Server (HSS), Packet Data Interworking/Access Gateway (PDIF/AGW), and Media Gateway Control (MGCF), wherein a first node from the plurality of interconnected nodes provides a first service selected from the group; and a master node configured to determine that a second node that provides a different, second service has failed, and to send to the first node, a notification of the failure of the second node;

wherein the first node is configured, upon receipt of the notification, to provide the different, second service, or a portion of the different, second service, so as to maintain continuity of an existing session.

2. The self-organizing network architecture of claim 1 wherein the master node includes a database containing operator policy and state information for all nodes under its control.

3. The self-organizing network architecture of claim 2 further comprising:

means for discovering nodes comprising the plurality of nodes.

4. The self-organizing network architecture of claim 3 wherein each of the plurality of nodes further comprises:

means for requesting a role within the self-organizing network, wherein the role includes one or more services from the group for the requesting node to provide.

5. The self-organizing network architecture of claim 4 wherein the master node further comprises:

means for assigning roles to individual nodes within the self-organizing network.

6. A method of operating a self-organizing network having a plurality of interconnected nodes, the network providing Internet Protocol Multimedia Services (IMS), the method comprising the steps of:

discovering the plurality of interconnected nodes and their individual capabilities;

assigning one or more roles to each one of the plurality of discovered nodes based on the capabilities of each node, wherein said roles are ones selected from a group consisting of: Serving-Call Session Control (S-CSCF), Interrogating-Call Session Control (I-CSCF), Proxy-Call Session Control (P-CSCF), Home Subscriber Server (HSS), Packet Data Interworking/Access Gateway (PDIF/AGW), and Media Gateway Control (MGCF), wherein a first node from the plurality of interconnected nodes provides a first service selected from the group; and sending from a master node to the first node, a notification that a second node that provides a different, second service has failed;

upon receipt of the notification, providing the different, second service, or a portion of the different, second service, by the first node so as to maintain continuity of an existing session.

7. The method of claim 6 further comprising the step of:

reassigning one or more roles to individual nodes as a result of a network event.

8. The method of claim 6 further comprising the step of:

monitoring the plurality of nodes by the master node to determine whether one or more of the monitored nodes is troubled or failed.

9. A first network node in an Internet Protocol Multimedia Services (IMS) self-organizing network having a plurality of interconnected network nodes, wherein the first network node includes a processor and functional code stored on a non-transitory medium, wherein when the functional code is executed by the processor, the first network node is caused to:

provide a first service for an existing session, the first service being selected from a group consisting of: Serving-Call Session Control (S-CSCF), Interrogating-Call Session Control (I-CSCF), Proxy-Call Session Control (P-CSCF), Home Subscriber Server (HSS), Packet Data Interworking/Access Gateway (PDIF/AGW), and Media Gateway Control (MGCF); and upon receiving a notification that a second network node that provides a different, second service for the session has failed, provide the different, second service, or a portion of the different, second service, so as to maintain continuity of the existing session;

wherein when the first network node provides the portion of the different, second service, the first network node is configured to determine which portion of the different, second service the first network node is to provide by negotiating with one or more other network nodes of the plurality of interconnected network nodes.

* * * * *